Dec. 24, 1968  K. H. SCHMIDT ET AL  3,418,286
METHOD OF MAKING POLYESTERS UNDER REDUCED PRESSURE
Filed Aug. 2, 1965
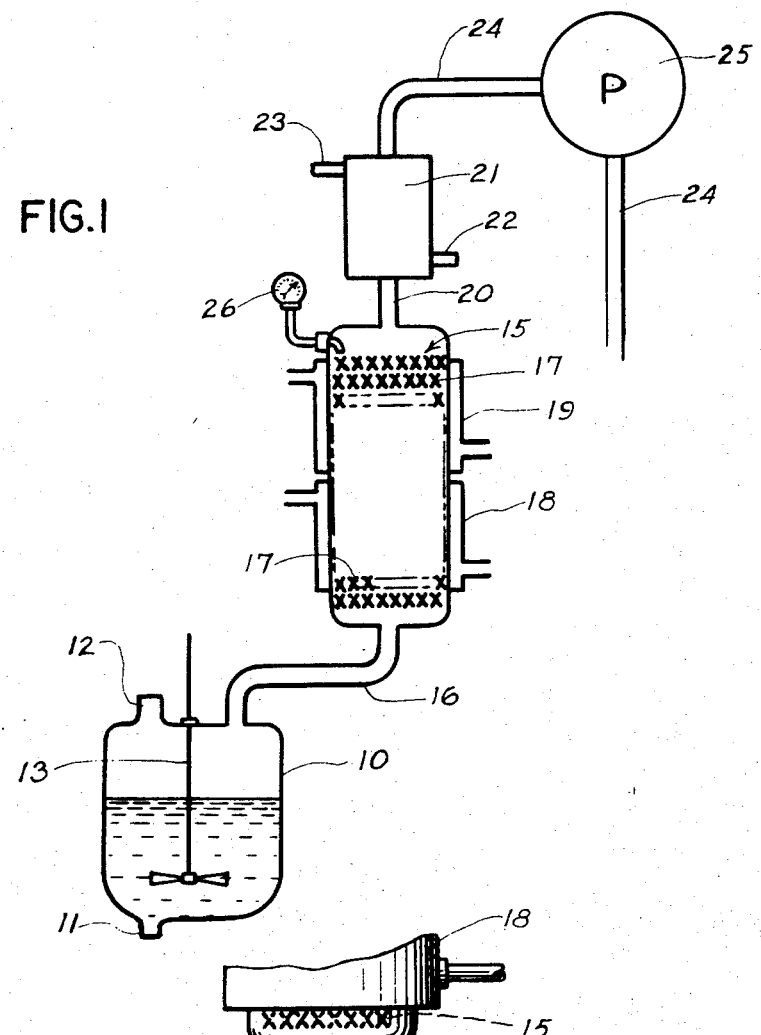
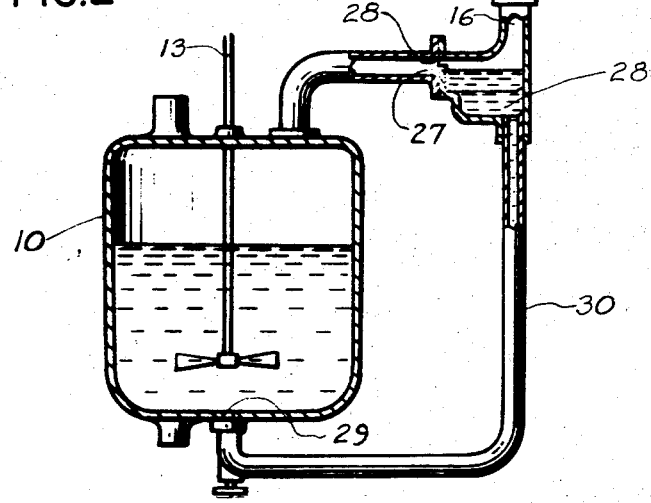

United States Patent Office 3,418,286
Patented Dec. 24, 1968

3,418,286
METHOD OF MAKING POLYESTERS UNDER
REDUCED PRESSURE
Karl H. Schmidt, Newark, Ohio, Arthur Weber, Wyckoff, N.J., David Rowe, South Gate, Calif., and John B. Brinker, Cincinnati, Ohio, assignors to Interchemical Corporation, New York, N.Y., a corporation of Ohio
Filed Aug. 2, 1965, Ser. No. 476,288
8 Claims. (Cl. 260—75)

ABSTRACT OF THE DISCLOSURE

A method of preparing polyester resins by a fusion process which involves passing the water vapor containing glycol through a heated fractionating column and allowing the glycol to return to the reactor. Vacuum or reduced presure is not applied to the reacting system until the esterification reaction has gone ⅓ of the way to completion and before the reaction has gone ¾ of the way to completion. The claimed process secures the increased reaction rate of subatmospheric pressures without any attendant loss of glycol.

---

This invention relates to the preparation of polyester resins and more particularly to the preparation of such polyester resins by a fusion cook which is bulk polymerization in the absence of solvents.

Polyester resins are the reaction products of polyhydric alcohols and polycarboxylic acids which may be used in the form of their anhydrides. For example, one type of polyester resin is produced by reacting an $\alpha,\beta$-ethylenically unsaturated dicarboxylic acid, e.g. maleic acid with glycol such as propylene glycol or dipropylene glycol. The reaction is usually carried out at an inert atmosphere which is usually produced by passing carbon dioxide, nitrogen or other inert gases through the mixture. The polyester is usually further modified by replacing a portion of the unsaturated dicarboxylic acid with a saturated acid such as phthalic acid including phthalic anhydride, terephthalic acid or isophthalic acid. Polyester resins of the type described above are often subsequently blended with a liquid copolymerizable monomer such as styrene and the blend copolymerized to form a cross-linked resin.

The reactions of the polyhydric alcohols and the polycarboxylic acids on an industrial scale are generally relatively slow and methods are continually being sought to speed up the reaction. Attempts have been made to speed up the rate of this reaction through the application of a vacuum or subatmospheric pressure. Such attempts have been less than successful primarily due to loss of glycols and other polyhydric alcohols which volatilize at lower temperatures at the subatmospheric pressures of the reaction.

We have now developed a novel method of polyester preparation which secures the increased reaction speeds of subatmospheric pressures without any attendant loss of glycols. In the method of this invention, the vacuum or the reduced pressure is not applied to the reacting system until the esterification reaction has gone ⅓ of the way to completion and before the reaction has gone ¾ of the way to completion.

In addition, the vapors produced by the reaction, which is conducted at a temperature above 350° F. and preferably between 390–440° F., are passed through a fractional distillation zone, the lower end of which has a temperature preferably between 240 to 420° F. while the upper end of which has a temperature preferably between 200 to 230° F. The temperature at the upper end of the zone is below the boiling point of the polyhydric alcohol used. The vapors exiting from the upper end of the zone are almost entirely water vapor; they may contain very small amounts of the polyhydric alcohol e.g., in the order of up to 10% by weight; such loss of polyhydric alcohol would not be significant with respect to expense or efficiency of the method. However, we have found it important to the proper functioning of the method of this invention that the upper end of the zone be maintained at a temperature of 200 to 230° F. This is accomplished, as will be described in greater detail hereinafter in connection with the drawings, by passing the vapors exiting from the fractional distillation zone through a condenser to condense a portion of the vapors and returning the condensed portion of the vapors to the upper end of the zone. The remainder of the vapors from the condenser are permitted to exit from the condenser. The condenser is operated at such a temperature that a sufficient quantity of the vapors are condensed and returned to the upper end of the zone to have a cooling effect which will maintain the temperature at the upper end of the zone at a vapor temperature of 210 to 280° F. Also, in the method of this invention, once the vacuum is applied or the presure reduced below atmospheric, the pressure is regularly reduced thereafter until a pressure of from 120 to 210 mm. of mercury absolute is reached. Then, the pressure is maintained at said lower level until the reaction is complete.

It should be noted that unless otherwise indicated, all proportions in the specification and claims are by weight. The process of this invention may be used very successfully in the preparation of halogen-containing polyester resins made from glycols, $\alpha,\beta$-ethylenically unsaturated dicarboxylic acids and halogenated dicarboxylic acids. However, it may be applied also, with excellent results, to the preparation of polyester resins generally, using the polyhydric alcohols, polycarboxylic acids and modifying agents well known to the art. It will be understood that the acids may be present as their anhydrides, as is conventional, and that references herein to "acids" are intended to cover the corresponding anhydrides.

The proportions of the polyester-forming reactants should be such that the number of carboxyl radicals is roughly equal to the number of hydroxyl radicals supplied by said reactants. Preferably, there is a slight excess of hydroxyl radicals. Thus, when the polyhydric alcohol is a glycol, a 2.5 to 15% excess of glycol over the stoichiometric proportions yields very good results.

The reactants may be combined in any desired sequence. For example, when maleic anhydride, phthalic anhydride and propylene glycol are reacted, all of the reactants may be mixed together initially or either of the anhydrides may be reacted with an excess of the glycol, the other anhydride added thereafter.

The preferred polyhydric alcohols include ethylene glycol propylene glycol, butylene glycol, diethylene glycol and dipropylene glycol as well as neopentyl glycol and hydrogenated Bisphenol A (2,2 bis(hydroxyphenyl)propane) or propoxy or ethoxy ethers of Bisphenol A, triethylene glycol, tripropylene glycol, 1,3-butanediol, 1,4-butanediol, 1,6-hexamethylene glycol and trimethyl propanediol. Other polyols which may be used include glycerine, pentaerythritol, trimethylol ethane and trimethylol propane.

The $\alpha,\beta$-ethylenically unsaturated dicarboxylic acids are preferably maleic anhydride and fumaric acid. The phthalic acid component may be isophthalic acid, terephthalic acid, phthalic anhydride, hexachloroendomethylenetetrahydrophthalic acid, tetrachlorophthalic anhydride, tetrabromophthalic acid, tetrahydrophthalic anhydride and hexahydrophthalic anhydride.

This invention will be better understood by reference to the drawings in which:

FIGURE 1 is a diagrammatical drawing of apparatus useful in the method of this invention, and FIGURE 2 is a detailed diagrammatical drawing of a reaction vessel used in a desirable aspect of the method of this invention.

In the apparatus of FIGURE 1, 10 is a reaction vessel which is provided with conventional heating means (not shown), pipe means 11 for removing the reaction product, means 12 for feeding the reactants into the vessel and stirring means 13 driven by a motor (not shown). Fractional distillation column 15 is connected to vessel 10 by conduit 16. Column 15 may be packed e.g., with saddles, in place of plates. The column packing must be equivalent to at least one theoretical plate. The column is insulated against heat loss and is enclosed by a pair of heating jackets 18 and 19. Vapors from the column pass through pipe 20 into condenser 21 to which a liquid coolant is supplied through intake tube 22, and the coolant is removed through exit tube 23. The vapors from condenser 21 are vented through conduit 24. Suction pump 25 is operatively associated with conduit 24 and may be used to apply a partial vacuum to the entire system. In a typical cycle of operation, the reactants are charged into vessel 10 and are heated to the selected reaction temperature between 350° and 440° F. The water of esterification formed by the reaction plus some of the polyhydric alcohol e.g., glycol pass as vapor through conduit 16 into column 15, the lower end of which is maintained at a temperature of 240° to 390° F. while the upper end is maintained at a temperature of 200° to 280° F. The temperature at the upper end is less than that of the lower end and is below the boiling point of the glycol used. When the column operates under these conditions the glycol vapors leaving the column through pipe 20 are very small in proportion and almost negligible. However, since the column is insulated, the temperature in the column will tend to increase as the esterification reaction proceeds toward completion. In order to cool the column so as to control the temperature to maintain the upper end of the column at the selected temperature between 200 to 280° F. and consequently the lower end at the related temperature between 240° to 390° F., condenser 21 is operated under such conditions that a sufficient quantity of the vapors exiting the column through pipe 20 are condensed, cooled and returned to the upper end of the column through pipe 20. This is accomplished by regulating the rate of flow of the coolant which passes through condenser 21. For example, when the temperature at the upper end of the column as indicated on thermometer gauge 26 rises above the selected level, the rate of liquid coolant, which is at a temperature below the boiling point of water and below the temperature at the upper end of the column, passed through condenser 21 via intake and exit tubes 22 and 23 is increased. This results in a greater amount of the vapors exiting the column being condensed, cooled and returned to the upper end of the column. When the temperature at the top of the column is lowered to the selected level, the rate of flow of coolant through the condenser is stabilized at this point. Conversely, when temperature at the upper end of the column becomes too low, the rate of flow of coolant through condenser 21 is decreased. The uncondensed vapors are vented from condenser 21 through conduit 24. After which they may be condensed and collected by apparatus not shown. The condensed liquid is predominantly the water of esterification with only negligible amounts of glycol.

When the reaction has proceeded from 1/3 to 3/4 toward completion, the pressure on the reaction is reduced to subatmospheric pressure by the creation of a partial vacuum with suction pump 25. The extent of the progress of the reaction toward completion may be determined by the amount of water of esterification collected in comparison with the theoretical amount which should be produced by the complete reaction. An example of a preferred manner of determining when to start to apply the partial vacuum is as follows:

After 1/3 of the theoretical water of esterification is collected (since the amount of glycol present is negligible, the total condensate taken from conduit 24 may be regarded as water of esterification), the rate of collection of water of esterification is observed. When the rate of collection falls below 10 to 20% of the total theoretical water of esterification per hour, then the pressure is reduced below atmospheric by means of suction pump 25. The pressure is gradually reduced preferably at a rate in the order of 100 mm. of mercury per 10 minutes until a pressure between 120 and 210 mm. of mercury absolute is achieved and then the reaction is continued to completion under this reduced pressure. During the application of this subatmospheric pressure, the reaction vessel is still preferably maintained at the original reaction temperature. However, the temperature in the column may be permitted to drop so that the temperature at the upper end of the column is preferably between 110° and 150° F.

Optionally the process of this invention may be carried out with or without a conventional inert sparging gas. When such a gas is used, it is bubbled into the reaction mixture in vessel 10 in the conventional manner.

In accordance with a more specific and preferred aspect of this invention, the modified apparatus for which is shown in FIGURE 2, the glycol which is condensed in column 15 is not returned to the upper portion of the reaction mixture by means of conduit 16 but is instead returned to the lower portion of the reaction mixture via shunt tube 30. Wall 27 blocks conduit 16 except for an opening 29 which permits the passage of vapor up through the conduit. The liquid glycol condensed in column 15 passing down conduit 16 is retained by wall 27 and collects in reservoir 28 which is connected to the bottom of reactor vessel 10 by means of conduit 30. Since the level in reservoir 28 is higher than that in the vessel 10, the accumulated glycol will be moved into vessel 10 through opening 29 by the head of pressure formed. Opening 29 may be provided with a suitable valve to regulate the entering.

The recycled glycol being bubbled into the reaction mixture under pressure acts as an entraining liquid for the water of esterification and acts to speed up the reaction by entraining water of esterification.

The following examples of the operation of our method will further illustrate the practice of this invention.

Example I

Using the apparatus of FIGURE 1, 50 moles of maleic anhydride, 50 moles of phthalic anhydride and 105 moles of propylene glycol are heated to a temperature of 390° F. in the reaction vessel while nitrogen is bubbled through the mixture. The top of the column is maintained at a temperature of 200–215° F. and the reaction mixture is maintained at a temperature of about 410° F. The gas coming over through the condenser which is predominantly water vapor is collected and condensed. After 30 minutes, about 50% of the calculated water of esterification is collected. At this point, a subatmospheric pressure or partial vacuum of about 660 mm. of mercury absolute is applied to the areaction and the reaction continued. Thereafter at 10-minute intervals, the pressure is reduced by 100 mm. per interval until a pressure of 155 mm. of mercury absolute is being applied to the reaction. As the pressure is decreased and the reaction temperature is maintained at about 410° F., the temperature at the top of the column drops. The reaction is continued at a temperature of about 410° F. a column top temperature of 100°–125° F. and a pressure of 150–160 mm. mercury absolute for about 3 hours or until an acid number of less than 45 is reached.

Example II

|                    | Moles |
|--------------------|-------|
| Diethylene glycol  | 84    |
| Ethylene glycol    | 22    |
| Isophthalic acid   | 45    |
| Fumaric acid       | 55    |

Using the components set forth above, Example I is repeated using the same conditions and procedure except that the reaction mixture is maintained at 430° F. and the top of the column is held at 120°–135° F. at 150–160 mm. Also the reaction is continued until the acid number is less than 30.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

In the present specification and claims all proportions are by weight unless otherwise indicated.

We claim:

1. A method of making a polyester resin which comprises heating a solvent-free mixture comprising a polyhydric alcohol and an α,β-ethylenically unsaturated dicarboxylic acid of four carbon atoms, in which a 2.5 to 15% excess of polyhydric alcohol over the stoichiometric amount of acid is present, at a temperature above 350° F. to polymerize said mixture by esterification, and to evaporate the water of esterification and part of the polyhydric alcohol, passing the vapor mixture of evaporated water and polyhydric alcohol through a fractional distillation zone, the lower end of which has a vapor temperature of from about 240° to 390° F. while the upper end of which has a lower vapor temperature of from 200° to 280° F., said upper end temperature being below the boiling point of the polyhydric alcohol and then passing the vapors from the fractional distillation zone through a condenser to condense a portion of the vapors, and returning the condensed portion of the vapors to the upper end of said zone to control the temperature of said zone, the remainder of the vapors being permitted to pass out of the condenser, said condenser being maintained at such a temperature that a sufficient quantity of the vapors are condensed and returned to maintain the upper end of the zone at a vapor temperature of 210° to 280° F. and applying to the mixture being heated, the distillation zone and the condenser a subatmospheric pressure after from ⅓ to ¾ of the water esterification has passed out of the condenser as vapor, the applied pressure being gradually reduced from atmospheric pressure to a minimum pressure of from 120 to 210 mm. of mercury absolute and maintained at said level of pressure until the completion of the esterification.

2. The method of claim 1 wherein said solvent-free mixture further includes a phthalic acid.

3. The method of claim 1 wherein said polyhydric alcohol is a glycol.

4. The method of claim 3 wherein said dicarboxylic acid is maleic anhydride.

5. The method of claim 2 wherein said phthalic acid is isophthalic acid.

6. The method of claim 3 wherein said dicarboxylic acid is fumaric acid.

7. A method of making a polyester resin which comprises heating a solvent-free mixture comprising a polyhydric alcohol and an α,β-ethylenically unsaturated dicarboxylic acid of four carbon atoms, in which a 2.5 to 15% excess of polyhydric alcohol over the stoichiometric amount of acid is present, at a temperature above 350° F. to polymerize said mixture by esterification, and to evaporate the water of esterification and part of the polyhydric alcohol passing an inert gas through the mixture, passing the vapor mixture of the inert gas, evaporated water and polyhydric alcohol through a fractional distillation zone, the lower end of which has a vapor temperature of from about 240 to 420 while the upper end of which has a lower vapor temperature of from 200 to 230, said upper end temperature being below the boiling point of the polyhydric alcohol and then passing the vapors from the fractional distillation zone through a condenser to condense a portion of the vapors and returning the condensed portion of the vapors to the upper end of said zone to control the temperature of said zone, the remainder of the vapors being permitted to pass out of the condenser, said condenser being maintained at such a temperature that a sufficient quantity of the vapors are condensed and returned to maintain the upper end of the zone at a vapor temperature of 210° to 280° F. and applying to the mixture being heated, the distillation zone and the condenser a subatmospheric pressure after from ⅓ to ¾ of the water esterification has passed out of the condenser as vapor, the applied pressure being gradually reduced from atmospheric pressure to a minimum pressure of from 120 to 210 mm. of mercury absolute and maintained at said level of pressure until the completion of the esterification.

8. The method of claim 1 wherein polyhydric alcohol which is condensed in the fractional distillation zone is continuously collected and injected into the solvent-free mixture at a liquid pressure greater than that of the mixture whereby the injected polyhydric alcohol acts to carry the water of esterification from the mixture.

References Cited

UNITED STATES PATENTS

| 2,961,430 | 11/1960 | Davis et al.  | 260—75 |
| 2,980,650 | 4/1961  | Wilson et al. | 260—75 |
| 3,109,831 | 11/1963 | Seiner        | 260—75 |
| 3,109,832 | 11/1963 | Seiner        | 260—75 |
| 3,109,834 | 11/1963 | Seiner        | 260—75 |

WILLIAM H. SHORT, *Primary Examiner.*

L. P. QUAST, *Assistant Examiner.*